(12) United States Patent
Casagrande et al.

(10) Patent No.: US 8,549,569 B2
(45) Date of Patent: Oct. 1, 2013

(54) ALTERNATIVE AUDIO CONTENT PRESENTATION IN A MEDIA CONTENT RECEIVER

(75) Inventors: Steven M. Casagrande, Castle Rock, CO (US); Anthony F. Kozlowski, Monument, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 6 days.

(21) Appl. No.: 13/163,249

(22) Filed: Jun. 17, 2011

(65) Prior Publication Data

US 2012/0324505 A1    Dec. 20, 2012

(51) Int. Cl.
| | |
|---|---|
| H04N 5/04 | (2006.01) |
| H04N 9/44 | (2006.01) |
| H04N 9/475 | (2006.01) |
| H04N 7/10 | (2006.01) |
| H04N 7/025 | (2006.01) |
| H04N 5/445 | (2011.01) |
| H04N 7/173 | (2011.01) |
| G06F 3/00 | (2006.01) |
| G06F 13/00 | (2006.01) |

(52) U.S. Cl.
USPC ............ 725/94; 725/32; 725/37; 725/48; 725/49; 725/86; 348/500; 348/512; 348/515; 348/518

(58) Field of Classification Search
USPC ........................................................ 725/14
See application file for complete search history.

(56) References Cited

U.S. PATENT DOCUMENTS

| | | | | |
|---|---|---|---|---|
| 5,844,600 | A * | 12/1998 | Kerr .......................... | 348/14.12 |
| 6,630,963 | B1 * | 10/2003 | Billmaier ...................... | 348/485 |
| 2003/0065503 | A1 * | 4/2003 | Agnihotri et al. ................. | 704/7 |
| 2005/0015444 | A1 * | 1/2005 | Rambo ......................... | 709/204 |
| 2006/0072906 | A1 * | 4/2006 | Van Gestel et al. ............. | 386/98 |
| 2007/0266414 | A1 * | 11/2007 | Kahn et al. .................... | 725/113 |
| 2009/0254933 | A1 * | 10/2009 | Gupta et al. ................... | 725/14 |

* cited by examiner

Primary Examiner — Justin Shepard
(74) Attorney, Agent, or Firm — Lowe Graham Jones PLLC

(57) ABSTRACT

Presented herein is a method of presenting alternative audio content for an audio/visual content segment, such as a television program or a motion picture. In the method, the audio/visual content segment is received into a media content receiver. The audio/visual content segment includes primary visual content and primary audio content. A request to receive alternative audio content for the audio/visual content segment is transmitted. After transmitting the request, the alternative audio content is received into the media content receiver. The primary audio content is replaced with the alternative audio content to generate a revised audio/visual content segment. The revised audio/visual content is transferred for presentation to a user.

12 Claims, 5 Drawing Sheets

ALTERNATIVE AUDIO CONTENT PRESENTATION IN A MEDIA CONTENT RECEIVER

BACKGROUND

Access to a wide range of audio/visual media content, such as television programs, sporting events, motion pictures, and news programs, has increased dramatically over the years as a result of the appearance of cable television content providers, satellite television content providers, and, more recently, online media content providers. While many counterexamples exist, the majority of audio/visual media content is provided in the primary spoken language of the country or other geographical area in which the content is broadcast or transmitted. However, with the increasing ethnic and cultural diversity exhibited in many countries, access to audio/visual media content may be greatly enhanced by providing the content in multiple languages.

The National Television System Committee (NTSC) analog television broadcasting standard previously employed in the United States allowed for the transmission of a Second Audio Program (SAP), through which a single alternative audio track employing a second spoken language may be broadcast simultaneously with the main audio/video content channel. Current Advanced Television Systems Committee (ATSC) digital television broadcasting standards provide for multiple digital content sub-channels associated with a single television broadcaster. Conceivably, at least some of these sub-channels could be employed to broadcast multiple versions of the same program or content segment simultaneously, with each version employing a different spoken language or other version of the primary audio track. However, transmitting several different, but complete, versions of the same program or content segment may be costly in terms of broadcast bandwidth consumed.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
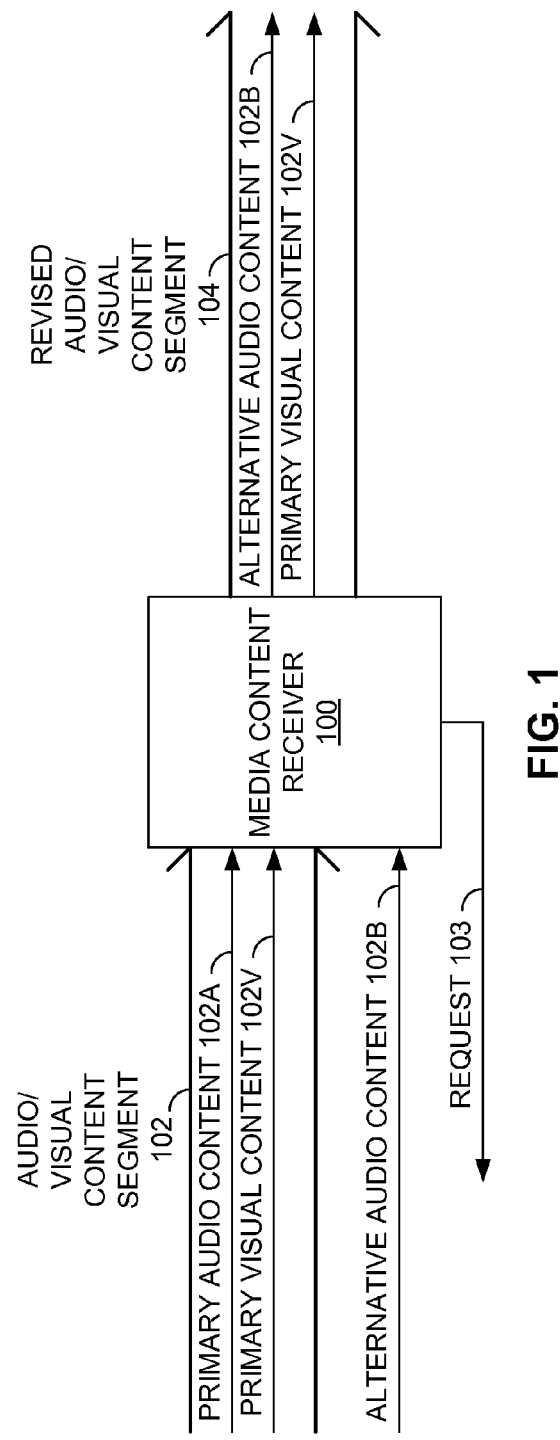
FIG. 1 is a simplified block diagram of a media content receiver according to an embodiment of the invention.

FIG. 1 is a simplified block diagram of a media content receiver 100 employable in various embodiments of the invention described more particularly below. The media content receiver 104 may be any device configured to receive an audio/visual content segment 102 that includes primary audio content 102A and primary visual content 102V. As is described in greater detail below, the media content receiver 100 is configured to also receive alternative audio content 102B, and replace the primary audio content 102A with the alternative audio content 102B, resulting in a revised audio/visual content segment 104 for presentation to a user. Examples of the media content receiver 100 may include, but are not limited to, television set-top boxes incorporating a DVR device, a standalone DVR unit, televisions or video monitors, desktop and laptop computers, and portable communication devices, such as cellular phones and personal digital assistants (PDAs). The media content receiver 100 may also forward the revised audio/visual content segment 104 to an output device, such as a television, video monitor, and/or audio receiver, or may incorporate such a device therein to present the content segment 104 directly to the user.

The received audio/visual content segment 102 may include any audio and visual information to be consumed simultaneously by a user. For example, the content segment 102 may include video and associated audio information normally associated with television broadcasts, but may include any other audio and visual information capable of being presented to a user. Further, the content segment 102 may be any segment of such visual and audio information intended to be presented to the user over some defined time period. Examples of the audio/visual content segment 102 include, but are not limited to, television programs, motion pictures, sporting events, and news-related programs. Additionally, the content segment 102 may be presented as a single, contiguous segment, or may be interrupted with one or more interstitial segments, such as commercial messages, broadcast station promotional segments, and the like.

Examples of networks or communication links over which the media content receiver 100 may receive the audio/visual content segment 102 include, but are not limited to, satellite, cable, and terrestrial ("over-the-air") television broadcast systems. Other such networks may include cellular phone networks (including third generation, or "3G", networks) and the Internet or other wide-area network (WAN) or local-area network (LAN) communication systems, whether or not of a broadcast variety. The receiver 100 may employ any wired or wireless transmission link, or some combination thereof, for receiving the audio/visual content segment 102.

Figure 2:
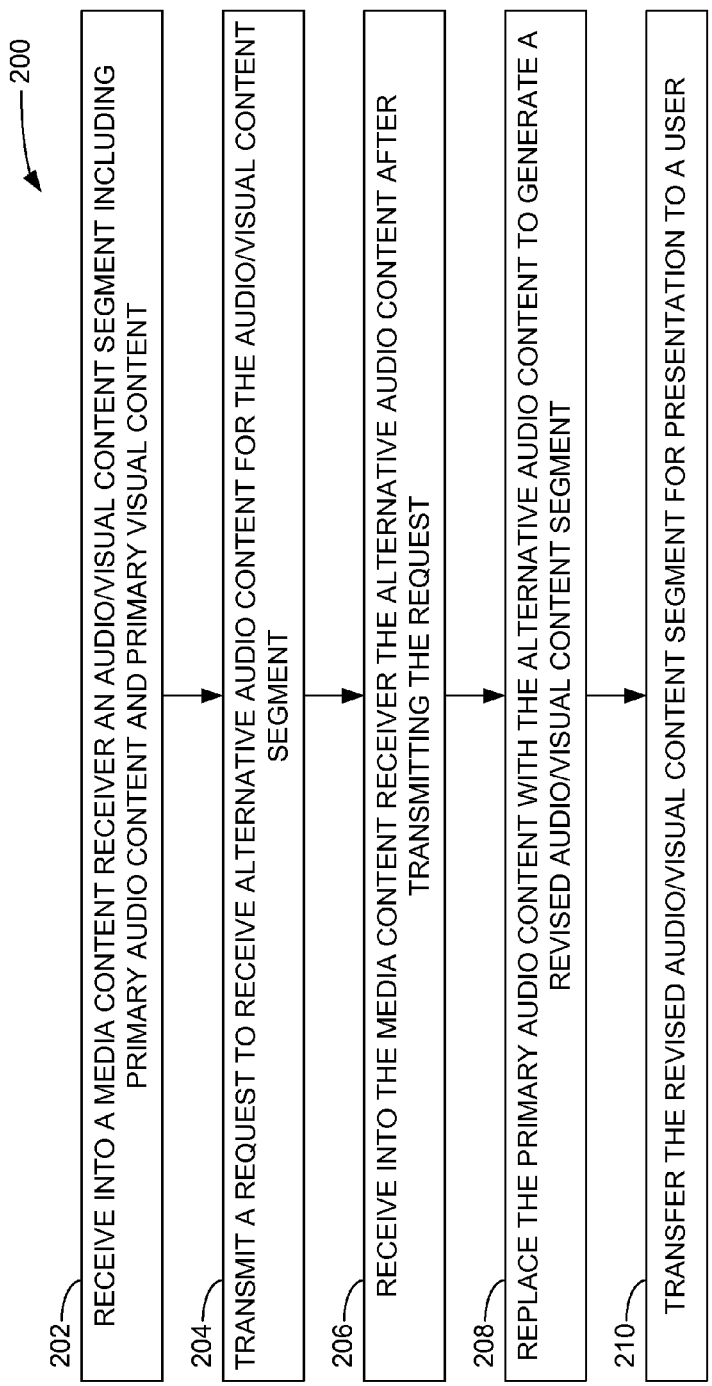
FIG. 2 is a flow diagram of a method according to an embodiment of the invention of presenting alternative audio content related to an audio/visual content segment, in reference to the media content receiver of FIG. 1.

FIG. 2 presents a method 200 of presenting alternative audio content related to an audio/visual content segment by way of a media content receiver (such as the receiver 100 of FIG. 1). In the method 200, using FIG. 1 as a reference, the media content receiver 100 receives the audio/visual content segment 102, wherein the audio/visual content segment 102 includes primary audio content 102A and primary visual content 102V (operation 202). A request 103 to receive alternative audio content 102B for the audio/visual content segment 102 is transmitted (operation 204). After transmitting the request 103, the alternative audio content 102B is received into the media content receiver 100 (operation 206). The primary audio content 102A is then replaced with the alternative audio content 102B to generate a revised audio/visual content segment 104 (operation 208). The revised audio/visual content segment 104 is transferred for presentation to the user (operation 210).

While the operations of FIG. 2 are depicted as being executed in a particular order, other orders of execution, including concurrent or overlapping execution of two or more implied or explicit operations, may be possible. For example, the replacement of the primary audio content 102A with the alternative audio content 102B (operation 208) may occur at the same time the resulting revised audio/visual content segment 104 is being transferred for user presentation (operation 210). Other examples of concurrent operation execution are also possible. In another embodiment, a computer-readable storage medium may have encoded thereon instructions for a processor or other control circuitry of an electronic device, such as the media content receiver 100 of FIG. 1, to implement the method 200.

As a result of employing the method 200, the audio portion of an audio/visual content segment may be replaced with alternative audio content in response to a request, such as from the viewer of the content segment. Accordingly, the alternative audio content need not be provided until such a request is made, thus eliminating any need to unconditionally provide the alternative audio content, thereby reducing the overall amount of processing and communication bandwidth required for a media content source or a third-party supplier to provide alternative audio content. Further, the use of the request may allow the viewer to select from any number of potential versions of alternative audio content, such as alternative language versions, or even alternative audio content versions with differing logical content, thus receiving only the alternative audio content of interest at the content receiver. Additional advantages may be recognized from the various implementations of the invention discussed in greater detail below.

Figure 3:
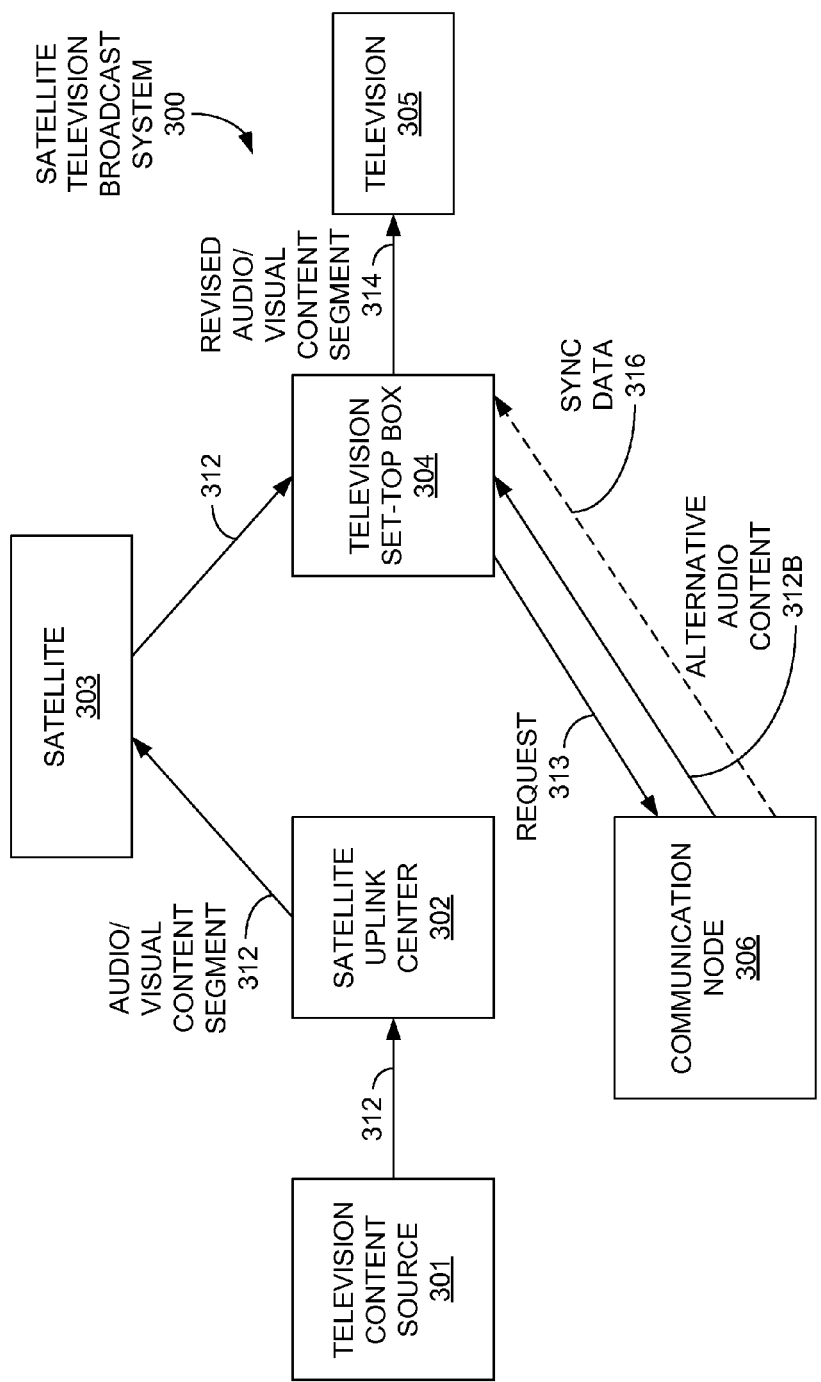
FIG. 3 is a block diagram of a satellite television broadcast system according to an embodiment of the invention.

FIG. 3 is a block diagram of a satellite television broadcast system 300 according to an embodiment of the invention. As shown, the satellite television broadcast system 300 includes a television content source 301, a satellite uplink center 302, a satellite 303, a television set-top box 304, a television 305 connected to the set-top box 304, and a communication node 306. The set-top box 304 may be viewed as a more specific example of the media content receiver 100 of FIG. 1. Multiple instances of several of these devices, such as multiple content sources 301, satellites 303, set-top boxes 304, and the like, may be included, but are not explicitly shown in FIG. 3. Further, other devices coupling the various components of the broadcast system 300 may be present, but are not discussed further herein to focus and simplify the following description of the various embodiments.

In the system 300 of FIG. 3, one or more television content sources 301—such as cable, satellite, or broadcast television networks, independent television outlets, Internet video sources, or any other type of content source—provide television content, including an audio/visual content segment 312, to the satellite uplink center 302 via satellite connection, wired communication, wireless communication, or other means. In turn, the satellite uplink center 302 receives the audio/visual content segment 312, processes the segment 312 for transmission, and the transmits the segment 312 to one or more satellites 303 by way of at least one communication channel of a satellite uplink. The uplink may also carry other information, such as electronic program guide (EPG) data and firmware upgrades for the set-top box 304. The satellite uplink center 302 may generate at least some of the television content, including the content segment 312, and/or associated information internally.

The satellite 303 employs at least one signal transponder (not explicitly shown in FIG. 3) to receive the various channels of content (including the audio/visual content segment 312) and related information on the satellite uplink, and retransmit the content and additional information via a satellite downlink to the television set-top box 304, as well as other set-top boxes not illustrated in FIG. 3. The television set-top box 304 is described with greater particularity below in conjunction with FIG. 4. Typically, the set-top box 304 is configured to receive the audio/visual content segment 312 on the downlink via a parabolic antenna and a low-noise block-converter (LNB) attached thereto. The television set-top box 304 is configured to process and transfer the received segment 312 for at least one television 305 for presentation to a user.

In the embodiments described herein, the television set-top box 304 is also configured to replace the audio content of the audio/visual content segment 312 with alternative audio content 312B received from the communication node 306. The communication node 306 may be any device or system configured to provide the alternative audio content 312B upon reception of a request 313 from the television set-top box 304, as shown in FIG. 3. The communication node 306 may be, for example, a computer network server that may be communicatively coupled via the Internet or another communication network or link to the television set-top box 304. While the communication node 306 is shown as a separate entity from the satellite uplink center 302, the communication node 306 may be incorporated within the satellite uplink center 302 in other implementations.

In one example, the request 313 includes an identification of the alternative audio content 312B desired, such as the name or other identification of the audio/visual content segment 312 associated with the alternative audio content 312B. Such a request 313 may also include a selection of the particular alternative audio content 312B desired in the case that multiple types of the alternative audio content 312B are available. In another example, the request 313 may include the original primary audio content 312A included in the audio/visual content segment 312. As explained more fully below, the communication node 306 may translate the spoken language of the primary audio content 312A into a second spoken language for the alternative audio content 312B to be presented to the user of the set-top box 304.

Along with the alternative audio content 312B, the communication node 306 may also provide synchronization data 316 to the set-top box 304 so that the television set-top box 304 may appropriately align or synchronize the alternative audio content 312B with the primary video content 312V so that the presentation of the resulting revised audio/visual content segment 314 to the user is correct. In other examples, such synchronization data 316 may not be necessary, as is described more completely below.

In an alternative example, set-top box 304 may be a thin client set-top box fed by an in-home server (not shown) that itself feeds a number of thin client set-top boxes. In this example, the server would communicate with satellite 303, and in turn, deliver primary audio and video content to set-top box 304. Set-top box 304 could then obtain alternative audio content 312B from communication node 306. The server may also provide the alternative audio content 312B to set-top box 304. Other arrangements utilizing such a server-thin client arrangement are possible.

Figure 4:
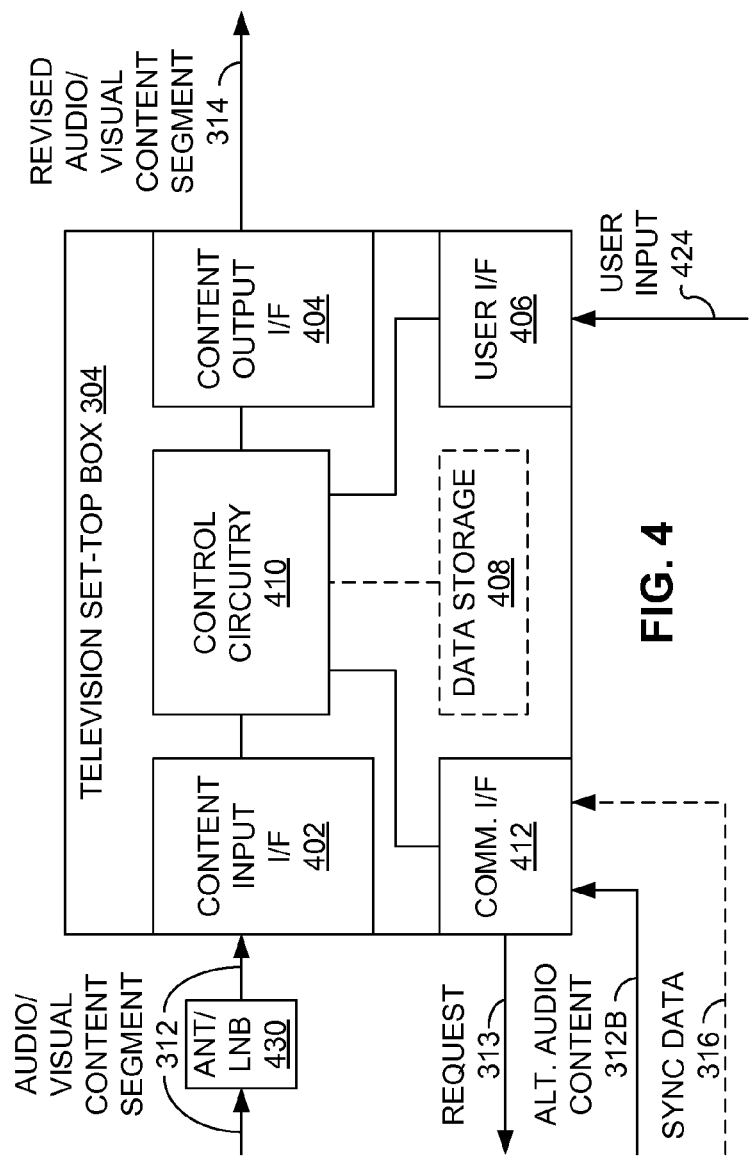
FIG. 4 is a block diagram of a television set-top box as employed in the satellite television broadcast system of FIG. 3 according to an embodiment of the invention.

An example of the television set-top box 304 of FIG. 3 is depicted in FIG. 4. In this case, the set-top box 304 includes a content input interface 402, a content output interface 404, a user interface 406, a communication interface 412, possibly data storage 408 for the storage of audio/visual content, and control circuitry 410 coupled to the other components 402-408 and 412 of the set-top box 304. Other components, such as a power supply, a "smart card" interface, and so forth, may also be included in the set-top box 304, but such components are not described further herein to simplify the following discussion.

The content input interface 402 receives television content, such as broadcast television programming, including the audio/visual content segment 312, from a content source, such as the source 301, via the satellite uplink center 302 and satellite 303 of FIG. 3. More specifically, the content input interface 402 receives the content segment 312 via an antenna/LNB combination 430, which receives, down-converts, and forwards the segment 312 to the content input interface 402, typically via a coaxial cable. The content input interface 402 may include one or more tuners for selecting particular programming channels of the incoming content for forwarding to a television, such as the television 305 of FIG. 3. The content input interface 402 may also perform any decryption, decoding, and similar processing of the received segment 312 required to place the segment 312 in a format usable by the content output interface 404. In one example, the content may be formatted according to one of the Motion Picture Experts Group (MPEG) formats, such as MPEG-2 or MPEG-4, although other audio/video content format standards may be utilized in other embodiments.

The content output interface 404 provides the selected and processed television content, including the revised audio/visual content segment 314, to the television 305 connected thereto. To that end, the content output interface 404 may encode the selected television content in accordance with one or more television output formats. For example, the content output interface 404 may format the revised content segment 314 for one or more of a composite or component video connection with associated audio connection, a modulated radio frequency (RF) connection, and a High Definition Multimedia Interface (HDMI) connection.

To allow a user to control various functions and aspects of the set-top box 304, including the selection of programming channels for viewing, as well as a request for the alternative audio content 312B, the user interface 406 receives user input 424 for such purposes. In many examples, the user interface 406 may be a remote control interface configured to receive the command input 424 by way of infrared (IR), radio frequency (RF), or other wireless signal technologies. To facilitate such information entry, the set-top box 304 may provide a menu system presented to the user via the connected television or video monitor. In some implementations, the user interface 406 may also include any of a keyboard, mouse, and/or other user input device.

The communication interface 412 may employ any of a number of wired or wireless communication technologies to transmit the request 313, as well as receive the alternative audio content 312B and any synchronization data 316. For example, the communication interface 412 may be an Ethernet, Wi-Fi (IEEE 802.11x), or Bluetooth® interface for connecting with an Internet gateway device for communicating with the communication node 306 over the Internet. In another implementation, the communication interface 412 may employ a direct connection to a phone line for communicating with the node 306.

The data storage 408 is configured to store several different types of information employable in the operation of the set-top box 304. This information may include, for example, stored audio/visual content, such as the content segment 312 or revised segment 314, which has been buffered or recorded for subsequent viewing. In other words, the data storage 408 may serve as a buffer to allow the viewer to employ fast forward, rewind, pause, slow motion, and other "trick mode" functions via the user interface 406, or as long-term DVR storage of previously recorded programs. Other information, such as electronic program guide (EPG) information, may also be included in the data storage 408. The data storage 408 may include volatile memory, such as static and/or dynamic random-access memory (RAM), and/or nonvolatile memory, such as read-only memory (ROM), flash memory, and magnetic or optical disk memory.

The control circuitry 410 is configured to control and/or access other components of the set-top box 304. The control circuitry 410 may include one or more processors, such as a microprocessor, microcontroller, or digital signal processor (DSP), configured to execute instructions directing the processor to perform the functions discussed more fully hereinafter. The control circuitry 410 may also include memory or data storage adapted to contain such instructions, or may utilize the data storage 408 for that purpose. The memory may also include other data to aid the control circuitry 410 in performing the tasks more particularly described below. In another implementation, the control circuitry 410 may be strictly hardware-based logic, or may include a combination of hardware, firmware, and/or software elements.

Figure 5:
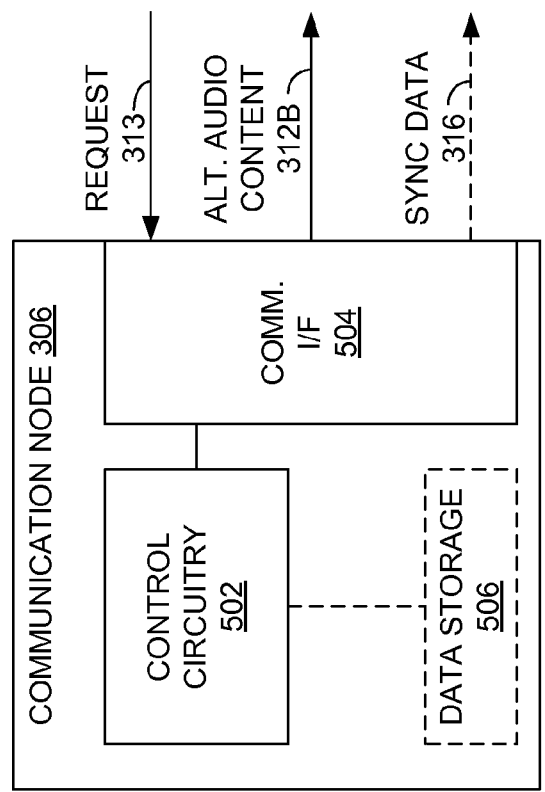
FIG. 5 is a block diagram of a communication node as employed in the satellite television broadcast system of FIG. 3 according to an embodiment of the invention.

FIG. 5 provides a block diagram of the communication node 306 of FIG. 3. The communication node 306 includes control circuitry 502, a communication interface 504, and possibly data storage 506. In at least some embodiments, the various characteristics of each of these components 502-506 are similar to those of the corresponding portions of the television set-top box 304 of FIG. 4. Generally, as discussed earlier, the communication node 306 is configured to receive the request 313 for the alternative audio content 312B via the communication interface 504. The control circuitry 502 is configured to process the request 312 to generate or retrieve the alternative audio content 312B, possible along with any necessary synchronization data 316, and transfer the content 312B and data 316 via the communication interface 504 to the set-top box 304. Depending on the implementation, the control circuitry 502 may generate the alternative audio content 312B spontaneously, or "on-the-fly", in response to the request 313, or the control circuitry 502 may have received or generated, and subsequently stored in the data storage 506, the audio content 312B and data 316 prior to the request 313.

Referring generally to FIGS. 3-5, according to one embodiment, the television set-top box 304 may receive a user instruction via the user input 424 to request or select the alternative audio content 312B to replace the primary audio content 312A of the audio/visual content segment 312 when presented to the user. In one example, the user enters the instruction while selecting an audio/video program from a menu via the EPG. The menu may provide multiple potential versions of alternative audio content 312B, such as those employing different languages for the dialog spoken in the content segment 312. In another example, the user may enter the instruction while selecting a program that was previously recorded from the content input interface 402 and stored in the data storage 408. Other methods of a receiving a user instruction to generate the request 313 may be employed in the control circuitry 410. In yet other examples, the control circuitry 410 need not receive an explicit user instruction to generate the request 313, but may instead represent a response to internal stimuli or instructions received from other than the user interface 406.

Other alternative audio content 312B other than alternative languages may be available in some examples. Another type of alternative audio content 312B available via the communication node 306 may be audio content provided by the Descriptive Video Service® (DVS®) or similar facility. This type of audio content informs sight-impaired users of visually-oriented actions or events occurring in the primary visual content 312V of the content segment 312. In another example, the alternative audio content 312B may include the primary audio content 312A supplemented by commentary provided by a director, actor, or other person involved in the production of the content segment 312. Yet another example of alternative audio content 312B may include the secondary audio program, or SAP. Many other types of alternative audio content 312B may be employed in other embodiments.

In response to the user instruction received via the user interface 406, or via some other means, the control circuitry 410 generates a request 313 to retrieve the selected alternative audio content 312B, and transmits the request 313 via the communication interface 412 to the communication node 406. In one example, the request 313 includes an identification of the audio/visual segment 312 associated with the desired alternative audio content 312B. Such identification may be sufficient in situations in which only a single type of alternative audio content 312B is available. In examples in which multiple alternative audio content 312B types are available, the request 313 may include an indication of the specific alternative content 312B type being requested, such as an identity of the specific language to be used in the alternative audio content 312B. In other embodiments, the request 313 may include the primary audio content 312A of the audio/visual content segment 312, possibly accompanied with the primary video content 312V.

In response to receiving the request 313 via its communication interface 504, the communication node 306, by way of its control circuitry 502, processes the request 313 to generate or retrieve the alternative audio content 312B, possibly along with synchronization data 316, for transmission back to the set-top box 304. If the request 313 includes solely an indication of the audio/visual content segment 312 involved, the control circuitry 502 presumes that a single type of alternate audio content 312B is available, or selects a default alternate audio content 312B type. In cases in which the request 313 includes a selection of the type of alternative audio content 312B, the control circuitry 502 need not make such an assumption. Under either scenario, the control circuitry 502 may retrieve the requested alternative audio content 312B from another device, or from the data storage 506 of the communication node 306. In one example, the alternative audio content 312B may be a professionally-produced soundtrack providing all of the background audio associated with the original audio content 512A. The communication node 306 may then forward the retrieved alternative audio content 312B via the communication interface 504 to the set-top box 304.

In another example, the control circuitry 502 may retrieve the primary audio content 312A, possibly along with the primary video content 312V, and then process the content 312 to generate the alternative video content 312B prior to transmission of the alternative audio content 312B to the set-top box. In the case of translating from one spoken language to another, the control circuitry 502 may translate from the language of the original audio content 312A to the desired language using a number of tools. For example, the control circuitry 502 may employ speech recognition hardware and/or software to generate text representing the spoken words of the primary audio content 312B in the original language. The control circuitry 502 may then employ a text-to-text converter to translate the generated text of the original language into text of a different language representing the dialog of the content segment 312. The control circuitry 502 may then generate audio representing the spoken words for the generated text by way of a voice synthesizer or similar software and/or hardware. Other methods for generating the spoken words of one language from the spoken words of another language may be employed.

In another example, the control circuitry 502 may generate the desired dialog for the alternative audio content 312B by way of closed captioning or other textual data included with the audio/visual content segment 312, such as data formatted according to the EIA-608 standard for NTSC (National Television System Committee) broadcasts and the EIA-708 standard for ATSC (Advanced Television Systems Committee) transmissions. Such data is typically embedded within the audio/visual content segment 312 as metadata for display to hearing-impaired viewers. As such data is typically representative of the spoken dialog appearing in the primary audio content 312A, the control circuitry 502 may employ this textual data as input to the text-to-text converter mentioned above in order to translate from an original language to a desired language for the alternative audio content 312B.

In the case of the control circuitry 502 generating the dialog for the alternative audio content 312B, the control circuitry 502 may cause the generated dialog to be transmitted as the alternative audio content 312B. In another example, the control circuitry 502 may mix the generated dialog with the original audio content 312A to yield the alternative audio content 312B, with the intent of masking the original dialog with the generated dialog. In yet another implementation, the control circuitry 502 may mix the generated dialog with a background soundtrack of non-dialog-related audio to form the alternative audio content 312B.

In one example, the alternative audio content 312B may be streamed via the communication interface 504 to the set-top box 304 as soon as each portion of the alternative audio content 312B is generated. Streaming the content 312B in such a manner may be important if the set-top box 304 requires delivery of the alternative audio content 312B as soon as possible, such as when viewing of the revised audio/visual content segment 314 is imminent or ongoing. In another example, the control circuitry 502 delivers the alternative audio content 312B as a single group of data, such as a file, after the entirety of the alternative audio content 312B has been generated. Presumably, delivering the alternative audio content 312B in this fashion occurs at some point before the presentation of the revised audio/visual content segment 314 at the set-top box 304 to the user begins.

In one embodiment in which the communication node 306 possesses access to the primary video content 512V, the control circuitry 502 may combine the alternative audio content 312B with the primary video content 312V to generate the revised audio/visual content segment 314. The control circuitry 502 may then transmit the revised content segment 314 via the communication interface 504 to the set-top box 304 in its entirety, thus negating the need for any synchronization data 316. In other implementations, the control circuitry 502 may deliver the alternative audio content 312B to the set-top box 304 alone without any synchronization data 316. For example, if the revised audio/visual segment 314 is to be delivered as a single contiguous presentation without any interruptions, and if the television set-top box 304 is capable of detecting or determining when presentation of the revised content segment 314 is to begin, the set-top box 304 may be capable of determining when to begin presentation of the alternative audio content 312B relative to the primary audio content 312V.

In many other examples, the control circuitry 502 generates synchronization data 316 to be employed at the set-top box 304 to synchronize or align the alternative audio content 312B with the primary video content 312V. The synchronization data 316 may synchronize the audio content 312B and the video content 312V at a single point within both types of content 312B, 312V, or at multiple points. The latter is especially useful in cases in which the revised audio/visual content segment 314 is apportioned into multiple portions separated by interstitials, such as commercial messages. In addition, the synchronization data 316 may be incorporated within the alternative audio content 312B, or transmitted as a separate data file to the set-top box 304.

In one embodiment, the synchronization data 316 may relate any kind of data or metadata of the primary video content 312V to that of the alternative audio content 312B. In one example, each portion, packet, or sample of the alternative audio content 312B may be related in the synchronization data 316 to one or more "frames", or individual still images, of the primary video content 312V by way of metadata associated with that frame, such as a Presentation Time Stamp (PTS), Decoding Time Stamp (DTS), or a reference time stamp of the frame. For example, the synchronization data 316 may indicate that a particular portion of the alternative audio content 312B be presented to the user simultaneously with a portion of the primary video content 312V at a specific PTS, DTS, or reference time stamp. Other types of metadata, whether normally incorporated within the primary video content 312V, or added for some other purpose, may be employed to generate the synchronization data 316.

In one implementation, textual data incorporated within, or associated with, the primary video content 312V, such as the closed captioning data mentioned above, may be utilized to generate the synchronization data 316. Generally, the textual data may include closed captioning data (e.g., data adhering to the CEA-608 and/or CEA-708 standards developed by the Electronic Industries Alliance (EIA)) and/or subtitle data intended to be displayed in conjunction with the video portion of the content segment 312.

If textual data is present as part of the audio/visual content segment 312, the control circuitry 502 of the communication node 306 may generate synchronization data 316 that relates a particular portion of the alternative audio content 312B to a unique portion of the textual data appearing at a particular point in time in the video content 312V. The unique portion of the textual data may be a word, phrase, sentence, or other collection of characters in the textual data. As a result, when the control circuitry 410 of the set-top box 304 receives the alternative audio content 312B and the synchronization data 316, the control circuitry 410 may synchronize the particular portion of the alternative audio content 312B specified in the synchronization data 316 with the portion of the video content 312V associated with the unique textual data also specified in the synchronization data 316. In another related embodiment, the synchronization data 316 may also include a frame offset or other offset value so that a portion of the alternative audio content 312B may be synchronized with a particular frame of the video content 312V based on a number of frames or some time value from the textual data specified in the synchronization data 316.

As mentioned above, several such instances of metadata, such as multiple portions of textual data included with the audio/visual content segment 312, may be included in the synchronization data 316 to ascertain and maintain synchronization between the alternative audio content 312B and the primary video content 312V in the revised audio/visual content segment 314. The use of multiple synchronization points may help in cases in which the content segment 314 includes several interstitial segments, as the synchronization data 316 may help maintain synchronization between the alternative audio content 312B and the video content 312V, even if the location of the interstitials is not known at the control circuitry 502 of the communication node 306.

In an example in which the control circuitry 502 of the communication node 306 has access to both the primary audio content 312A and the alternative audio content 312B, and in which both sets of content 312A, 312B include audio content in addition to spoken words, the control circuitry 502 may analyze both content sets 312A, 312B for one or more audio "signatures", or distinctive audio features typically associated with certain audio events, such as a door slam, a siren, a physical collision, and the like. The control circuitry 502 may then compare the audio signatures for similarities so that the two audio content sets 312A, 312B may be temporally aligned. From these similarities, the control circuitry 502 may generate synchronization data 316 aligning the alternative audio content 312B with the video content 312V based on the similarities in audio signatures.

In response to receiving the alternative audio content 312B and any related synchronization data 316, the control circuitry 410 of the set-top box 304 may employ the synchronization data 316 (if available) to synchronize or align the incoming the alternative audio content 312B with the primary video content 312V of the audio/visual content segment 312, thus replacing the primary audio content 312A to generate the revised audio/visual content segment 314. The revised segment 314 may then be transferred via the content output interface 404 for presentation to the user via the television 304 of FIG. 3.

In the set-top box 304, the replacement of the primary audio content 312A with the alternative audio content 312B may occur after the entirety of the alternative content 312B and any associated synchronization data 316 is received, or while the alternative content 312 and synchronization data 316 are still being received. In other implementations, the control circuitry 410 of the set-top box 304 may complete the replacement and synchronization to yield the revised content segment 314 before presentation of the revised content segment 314 via the content output interface 404 is initiated, or may perform the replacement as the revised content segment 314 is being output. Furthermore, the control circuitry 410 may delay presentation of the revised content segment 314 to allow for any time necessary to replace at least a portion of the primary audio content 314A with the alternative audio content 314B.

At least some of the embodiments presented above allow a set-top box or other media content receiving device to replace primary or original audio content in an audio/visual content segment with alternative audio content received from an external source upon request, such as audio content in an alternative spoken language, director commentary, or the like. Thus, the alternative audio content may be transferred only to the media content receivers that specifically request that content, thus saving valuable communication system bandwidth. Also, such a system allows the generation and retrieval of any of multiple types of alternative audio content for use in the receiver, wherein the number of audio content selections is not limited by bandwidth, number of channels, or any other characteristic of the system providing the audio/visual content to the receiver. Additionally, the alternative audio content may be pre-stored in a communication node for subsequent access via the receiver, or may be generated in the external communication node on-the-fly, especially in situations involving audio/visual content segments being shown or broadcast live.

While several embodiments of the invention have been discussed herein, other implementations encompassed by the scope of the invention are possible. For example, while various embodiments have been described largely within the context of a satellite television set-top box, the design of other types of media content receivers, such as cable and terrestrial television set-top boxes, standalone DVRs, cellular telephones, PDAs, and desktop and laptop computers, may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of presenting alternative audio content related to an audio/visual content segment, the method comprising:
receiving into a media content receiver the audio/visual content segment, wherein the audio/visual content segment comprises primary visual content and primary audio content;
receiving a request to present the alternative audio content for the audio/visual content segment, wherein the primary audio content is in a first language and the alternative audio content is in a second language different from the first language;
selecting at least one spoken word in the primary audio content, wherein the selected at least one spoken word is at a known location in the alternative audio content and is synchronized with a location of the primary visual content;
generating text representing spoken words of the primary audio content using speech recognition, wherein the selected at least one spoken word is included in the text representing spoken words of the primary audio content;
translating the text representing spoken words in the first language of the primary audio content into text in the second language using text-to-text conversion, wherein a translation of the selected at least one spoken word is included in the translated text in the second language;
generating the alternative audio content based on the translated text in the second language using voice synthesis;
replacing the primary audio content with the alternative audio content to generate a revised audio/visual content segment;
synchronizing the alternative audio content to the primary visual content based on a location of the translated selected at least one spoken word in the alternative audio content and the location of the primary visual content that was synchronized with the selected at least one spoken word of the primary audio content; and
transferring the revised audio/visual content segment for presentation to a user.

2. The method of claim 1, further comprising:
receiving an instruction from the user to replace the primary audio content of the audio/visual content segment with the alternative audio content;
wherein transmitting the request is performed in response to receiving the instruction.

3. The method of claim 1, wherein:
the request comprises an indication of the audio/visual content segment and a selection of the alternative audio content from a plurality of alternative audio content available for the audio/visual content segment.

4. The method of claim 1, wherein:
the request comprises the primary audio content of the audio/visual content segment; and
the alternative audio content is based on the primary audio content in the request.

5. The method of claim 1, wherein:
at least a portion of the alternative audio content is received into the media content receiver while the revised audio/visual content segment is being transferred for presentation to the user.

6. The method of claim 1, wherein:
the audio/visual content segment comprises textual data at a third location in the audio/visual content segment, wherein the textual data is configured to be displayed with the primary visual content, and wherein the textual data corresponds to spoken dialog appearing in the primary audio content; and
the synchronization data comprises data relating the second location within the alternative audio content to the third location of the textual data.

7. The method of claim 1, wherein synchronizing the primary visual content with the alternative audio content comprises:
synchronizing the alternative audio content with the primary visual content by analyzing the primary audio content and the alternative audio content for similarities; and
aligning the alternative audio content with the primary visual content according to the similarities.

8. The method of claim 6, wherein the textual data is closed captioning data.

9. The method of claim 6, wherein the textual data is subtitle data.

10. A method of presenting alternative audio content related to an audio/visual content segment, the method comprising:
receiving into a media content receiver the audio/visual content segment, wherein the audio/visual content segment comprises primary visual content and primary audio content;
receiving a request to present the alternative audio content for the audio/visual content segment, wherein the primary audio content is in a first language and the alternative audio content is in a second language different from the first language;
generating text representing spoken words of the primary audio content using speech recognition;
translating the text representing spoken words in the first language of the primary audio content into text in the second language using text-to-text conversion;
generating the alternative audio content based on the translated text in the second language using voice synthesis;
synchronizing the alternative audio content to the primary visual content; and
transferring the revised audio/visual content segment for presentation to a user.

11. The method of claim 10, wherein generating the text representing spoken words of the primary audio content is completed prior to receiving the audio/visual content segment into the media content receiver, and further comprising:

receiving into the media content receiver the text representing spoken words of the primary audio content, wherein the text representing spoken words of the primary audio content is received as one of closed captioning data and subtitle data.

12. The method of claim 10, wherein generating the text representing spoken words of the primary audio content is completed prior to receiving the audio/visual content segment into the media content receiver, and further comprising:

selecting at least one spoken word in the primary audio content, wherein the selected at least one spoken word is at a known location in the alternative audio content and is synchronized with a location of the primary visual content, wherein the selected at least one spoken word is included in the text representing spoken words of the primary audio content, and wherein a translation of the selected at least one spoken word is included in the translated text in the second language; and synchronizing the alternative audio content to the primary visual content based on a location of the translated selected at least one spoken word in the alternative audio content and the location of the primary visual content that was synchronized with the selected at least one spoken word of the primary audio content.

* * * * *